United States Patent
Hong

(10) Patent No.: US 12,525,268 B2
(45) Date of Patent: Jan. 13, 2026

(54) SEMICONDUCTOR DEVICES PROVIDING TEST MODE RELATED TO RELIABILITY

(71) Applicant: SK hynix Inc., Icheon-si (KR)

(72) Inventor: Yun Suk Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 245 days.

(21) Appl. No.: 18/342,517

(22) Filed: Jun. 27, 2023

(65) Prior Publication Data

US 2024/0282350 A1 Aug. 22, 2024

(30) Foreign Application Priority Data

Feb. 21, 2023 (KR) .......................... 10-2023-0022936

(51) Int. Cl.
| | | |
|---|---|---|
| G11C 29/02 | (2006.01) | |
| G11C 7/08 | (2006.01) | |
| G11C 7/12 | (2006.01) | |
| G11C 29/50 | (2006.01) | |

(52) U.S. Cl.
CPC .................. G11C 7/12 (2013.01); G11C 7/08 (2013.01); G11C 29/026 (2013.01); G11C 29/50 (2013.01); *G11C 2029/5004* (2013.01); *G11C 2207/065* (2013.01)

(58) Field of Classification Search
CPC ........... G11C 7/12; G11C 7/08; G11C 29/026; G11C 29/50; G11C 2029/5004; G11C 2207/065

USPC .......................................................... 365/203
See application file for complete search history.

(56) References Cited

U.S. PATENT DOCUMENTS

| | | | | | |
|---|---|---|---|---|---|
| 5,877,993 | A | * | 3/1999 | Biegel ................. | G11C 29/026 365/201 |
| 9,384,805 | B1 | * | 7/2016 | Lee ....................... | G11C 29/023 |
| 9,508,398 | B1 | * | 11/2016 | Shin ...................... | G11C 5/147 |
| 2017/0032830 | A1 | * | 2/2017 | Lee ....................... | G11C 11/4074 |
| 2020/0312385 | A1 | * | 10/2020 | Oak ....................... | G11C 7/12 |
| 2024/0233851 | A1 | * | 7/2024 | Jang ...................... | G11C 29/46 |

FOREIGN PATENT DOCUMENTS

KR 100818712 B1 4/2008

\* cited by examiner

*Primary Examiner* — Ly D Pham
(74) *Attorney, Agent, or Firm* — WILLIAM PARK AND ASSOCIATES LTD.

(57) ABSTRACT

A semiconductor device includes a pull-up source voltage generation circuit configured to drive a pull-up voltage to a normal voltage during a normal period and to drive the pull-source voltage to a test voltage during a test period. The semiconductor device also includes a pull-down source voltage generation circuit configured to drive a pull-down voltage to a ground voltage during the normal period and to drive the pull-down source voltage to a bit line pre-charge voltage during the test period. The semiconductor device further includes an equalization control signal driver configured to receive the pull-up source voltage and the pull-down source voltage to drive an equalization control signal for equalizing voltage levels of an internal bit line pair of a bit line sense amplifier.

12 Claims, 16 Drawing Sheets

SEMICONDUCTOR DEVICES PROVIDING TEST MODE RELATED TO RELIABILITY

CROSS-REFERENCE TO RELATED APPLICATION

The present application claims priority under 35 U.S.C. 119(a) to Korean Patent Application No. 10-2023-0022936, filed on Feb. 21, 2023, which is incorporated herein by reference in its entirety.

BACKGROUND

1. Technical Field

Some embodiments of the present disclosure relate to semiconductor devices providing a test mode related to reliability.

2. Related Art

Recently, as a thickness of a gate oxide film of a MOS transistor used in a semiconductor device has become thinner, when a high voltage level is applied to a gate of a MOS transistor, reliability issues such as hot carrier injection (HCI), time dependent dielectric breakdown (TDDB), and bias temperature instability (BTI) may arise. The HCI refers to a defect in which carriers are inserted into the gate oxide film, which changes the threshold voltage of the MOS transistor, and the TDDB is an extension of HCI, which means a defect in which a gate and a substrate are short-circuited by the carriers inserted into the gate oxide film. In addition, the BTI refers to a defect in which the threshold voltage of the MOS transistor is changed by repetitive changes in the voltage level applied to the gate.

SUMMARY

In accordance with an embodiment of the present disclosure is a semiconductor device including: a pull-up source voltage generation circuit configured to drive a pull-up voltage to a normal voltage during a normal period, and to drive the pull-source voltage to a test voltage during a test period; a pull-down source voltage generation circuit configured to drive a pull-down voltage to a ground voltage during the normal period, and to drive the pull-down source voltage to a bit line pre-charge voltage during the test period; and an equalization control signal driver configured to receive the pull-up source voltage and the pull-down source voltage to drive an equalization control signal for equalizing voltage levels of an internal bit line pair of a bit line sense amplifier.

Also in accordance with an embodiment of the present disclosure is a semiconductor device including: an equalization control signal driver configured to receive a pull-up source voltage that is driven to a test voltage boosted higher than a normal voltage and a pull-down voltage that is driven to a bit line pre-charge voltage boosted higher than a ground voltage, and configured to drive an equalization control signal during a test period in which a test operation is performed; and a bit line sense amplifier configured to equalize voltage levels of an internal bit line pair based on the equalization control signal.

Further in accordance with an embodiment of the present disclosure is a semiconductor device including: a pull-down source voltage generation circuit configured to drive a pull-down source voltage to a ground voltage during a normal period and to drive the pull-down source voltage to a bit line pre-charge voltage during a test period; and at least one cell block connected to a first signal line to which the bit line pre-charge voltage is applied, wherein the at least one cell block is connected to a second signal line to which the ground voltage is applied.

Additionally in accordance with an embodiment of the present disclosure is a semiconductor device including: a pull-up source voltage generation circuit configured to drive a pull-up voltage to a normal voltage during a normal period, and to drive the pull-source voltage to a test voltage during a test period; a pull-down source voltage generation circuit configured to drive a pull-down voltage to a ground voltage during the normal period, and to drive the pull-down source voltage to a bit line pre-charge voltage during the test period; and a driver configured to receive the pull-up source voltage and the pull-down source voltage to drive a control signal.

DETAILED DESCRIPTION OF THE EMBODIMENTS

In the following description of embodiments, when a parameter is referred to as being "predetermined," it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

Various embodiments of the present disclosure will be described hereinafter in more detail with reference to the accompanying drawings. However, the embodiments described herein are for illustrative purposes only and are not intended to limit the scope of the present disclosure.

Figure 1:
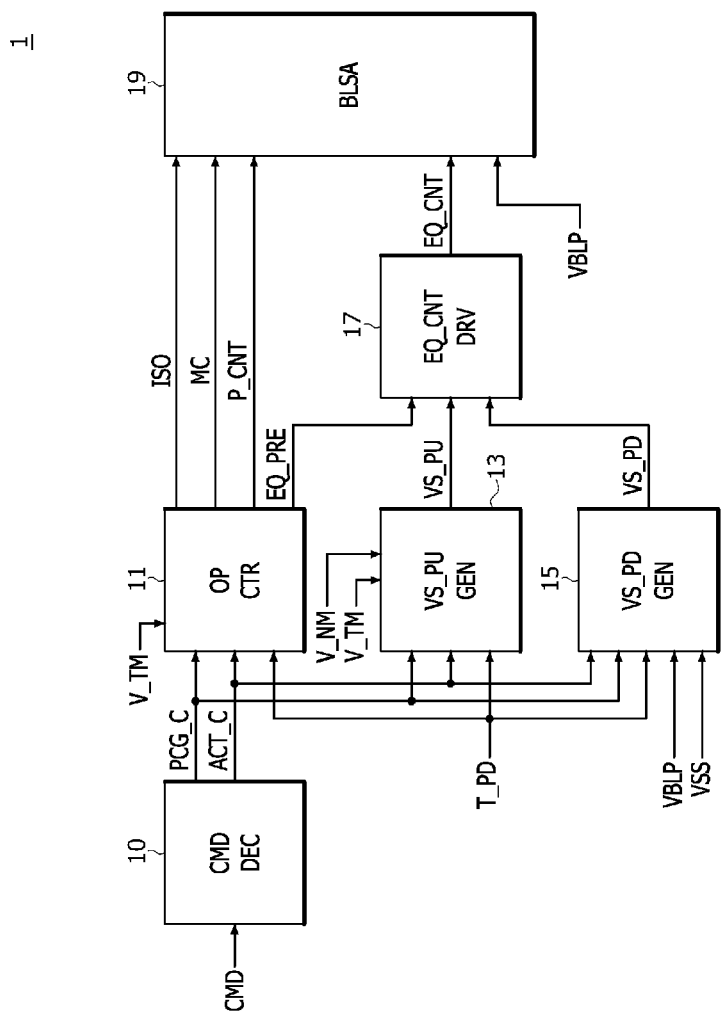
FIG. 1 is a block diagram illustrating a configuration of a semiconductor device according to an embodiment of the present disclosure.

FIG. 1 is a block diagram illustrating a configuration of a semiconductor device 1 according to an embodiment of the present disclosure. As shown in FIG. 1, the semiconductor device 1 may include a command decoder (CMD DEC) 10, an operation control circuit (OP CTR) 11, a pull-up source voltage generation circuit (VS_PU GEN) 13, a pull-down source voltage generation circuit (VS_PD GEN) 15, an equalization control signal driver (EQ_CNT DRV) 17, and a bit line sense amplifier (BLSA) 19.

The command decoder 10 may decode a command CMD to generate a pre-charge command PCG_C and an active command ACT_C. The command CMD may be applied to the command decoder 10 from an external device (1002 in FIG. 15, 2300 in FIG. 16). The pre-charge command PCG_C may be generated for a pre-charge operation, and the active command ACT_C may be generated for an active operation. The active operation and the pre-charge operation may be defined as normal operations.

The operation control circuit 11 may receive the pre-charge command PCG_C and the active command ACT_C from the command decoder 10. The operation control circuit 11 may generate an isolation control signal ISO, a compensation control signal MC, a pre-charge control signal P_CNT, and a pre-equalization control signal EQ_PRE based on the pre-charge command PCG_C, the active command ACT_C, and a test period signal T_PD. The test period signal T_PD may be activated during a test period in which a test operation of driving the compensation control signal MC, the pre-charge control signal P_CNT, and the equalization control signal EQ_CNT to a higher voltage level to check the reliability of NMOS transistors (23, 25, 29_1, and 29_2 in FIG. 5) included in the bit line sense amplifier 19 is performed. The test period signal T_PD may be generated inside the semiconductor device 1 or applied from the outside of the semiconductor device 1 according to embodiments. The isolation control signal ISO may be generated to isolate a bit line pair (BL and BLB in FIG. 5) and an internal bit line pair (IBL and IBLB in FIG. 5) in an active operation. The compensation control signal MC may be generated to compensate for the offset of the MOS transistors (21_1, 21_2, 27_1, and 27_2 in FIG. 5) included in the bit line sense amplifier 19 during a compensation period (td11 in FIG. 6) included in an active period in which an active operation is performed. The pre-charge control signal P_CNT may be generated to drive the internal bit line (IBL in FIG. 5) to a pre-charge voltage VBLP during an equalization period (td13 in FIG. 6) included in the pre-charge period in which the pre-charge operation is performed or the active period. The pre-equalization control signal EQ_PRE may be generated to equalize the voltage level of the internal bit line pair (IBL and IBLB in FIG. 5) during the pre-charge period or the equalization period. The operation control circuit 11 may drive the pre-charge control signal P_CNT and the compensation control signal MC to a test voltage V_TM during a test period (td21 in FIG. 7).

The pull-up source voltage generation circuit 13 may receive the pre-charge command PCG_C and the active command ACT_C from the command decoder 10. The pull-up source voltage generation circuit 13 may generate a pull-up source voltage VS_PU based on the pre-charge command PCG_C, the active command ACT_C, the test period signal T_PD, a normal voltage V_NM, and the test voltage V_TM. The pull-up source voltage generation circuit 13 may generate a pull-up source voltage VS_PU that is driven to the normal voltage V_NM during a normal period in which a normal operation including the active operation and the pre-charge operation is performed, and generate a pull-up source voltage VS_PU that is driven to a test voltage V_TM during a test period. The test voltage V_TM may be set to have a higher voltage level than the normal voltage V_NM for the test operation of applying a high voltage to the gate of each of the NMOS transistors (23, 25, 29_1, 29_2 in FIG. 5) included in the bit line sense amplifier 19. For example, the normal voltage V_NM may be set to 1.00 V, and the test voltage V_TM may be set to 2.15 V. The normal voltage V_NM and the test voltage V_TM may be generated by an internal voltage generation circuit (not shown) provided inside the semiconductor device 1, or may be applied from an external device (1002 in FIG. 15, 2300 in FIG. 16) of the semiconductor device 1.

The pull-down source voltage generation circuit 15 may receive the pre-charge command PCG_C and the active command ACT_C from the command decoder 10. The pull-down source voltage generation circuit 15 may generate a pull-down source voltage VS_PD based on the pre-charge command PCG_C, the active command ACT_C, the test period signal T_PD, a bit line pre-charge voltage VBLP, and a ground voltage VSS. The pull-down source voltage generation circuit 15 may generate a pull-down source voltage VS_PD that is driven to the ground voltage VSS during the normal period, and may generate a pull-down source voltage VS_PD that is driven to the bit line pre-charge voltage VBLP during the test period. The bit line pre-charge voltage VBLP may be provided to the bit line sense amplifier 19 to drive the internal bit line pair (IBL and IBLB in FIG. 5) during the pre-charge period or the equalization period. For example, the bit line pre-charge voltage VBLP may be set to 0.5 V, which is half the voltage level of the normal voltage V_NM. The pull-down source voltage generation circuit 15 may generate the pull-down source voltage VS_PD driven by the bit line pre-charge voltage VBLP boosted higher than the ground voltage VSS during the test period.

The equalization control signal driver 17 may receive the pre-equalization control signal EQ_PRE from the operation control circuit 11, may receive the pull-up source voltage VS_PU from the pull-up source voltage generation circuit 13, and may receive the pull-down source voltage VS_PD from the pull-down source voltage generation circuit 15. The equalization control signal driver 17 may generate the equalization control signal EQ_CNT based on the pre-equalization control signal EQ_PRE, the pull-up source voltage VS_PU, and the pull-down source voltage VS_PD. The equalization control signal driver 17 may include buffer circuits (133_1, 133_3, 133_5 in FIG. 4) that are driven by receiving the pull-up source voltage VS_PU and the pull-down source voltage VS_PD, and may generate an equalization control signal EQ_CNT by buffering the pre-equalization control signal EQ_PRE through the buffer circuits (133_1, 133_3, and 133_5 in FIG. 4). The buffer circuits (133_1, 133_3, and 133_5 in FIG. 4) included in the equalization control signal driver 17 may operate by receiving the pull-up source voltage VS_PU driven by the normal voltage V_NM during the normal period and the pull-down source voltage VS_PD driven by the ground voltage VSS during the normal period. Each of the buffer circuits (133_1, 133_3, and 133_5 in FIG. 4) included in the equalization control signal driver 17 may operate by receiving the pull-up source voltage VS_PU driven to the test voltage V_TM and the pull-down source voltage VS_PD driven to the bit line pre-charge voltage VBLP during the test period. During the test period, because the pull-down source voltage VS_PD is also set to the bit line pre-charge voltage VBLP higher than the ground voltage VSS when the pull-up source voltage VS_PU is set to the test voltage V_TM higher than the normal voltage V_NM, a gate-source voltage or a gate-drain voltage of each of the MOS transistors (135_1, 135_3, 135_5, 137_1, 137_3, 137_5 in FIG. 4) included in the buffer circuits (133_1, 133_3, and 133_5 in FIG. 4) may be maintained below a certain voltage level, thereby securing reliability of the MOS transistors (135_1, 135_3, 135_5, 137_1, 137_3, and 137_5 in FIG. 4).

The bit line sense amplifier 19 may receive the isolation control signal ISO, the compensation control signal MC, and the pre-charge control signal P_CNT from the operation control circuit 11, and may receive the equalization control signal EQ_CNT from the equalization control signal driver 17. The isolation control signal ISO, the compensation control signal MC, the pre-charge control signal P_CNT, and the equalization control signal EQ_CNT may be included in the operation control signals. The bit line sense amplifier 19 may perform the active operation, the pre-charge operation, and the test operation, based on the isolation control signal ISO, the compensation control signal MC, the pre-charge control signal P_CNT, the equalization control signal EQ_CNT, and the bit line pre-charge voltage VBLP. The isolation control signal ISO, the compensation control signal MC, the pre-charge control signal P_CNT, and the equalization control signal EQ_CNT may be set as the test voltage V_TM to be applied to the bit line sense amplifier 19 during the test period.

Figure 2:
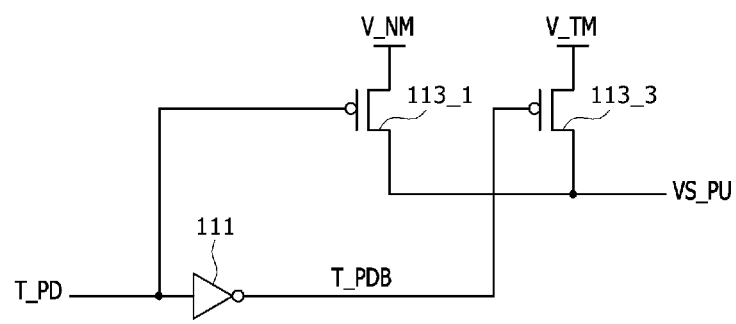
FIG. 2 is a circuit diagram illustrating a pull-up source voltage generation circuit according to an embodiment of the present disclosure.

FIG. 2 is a circuit diagram illustrating a pull-up source voltage generation circuit 13A according to an example of the pull-up source voltage generation circuit 13 in FIG. 1. As shown in FIG. 2, the pull-up source voltage generation circuit 13A may include an inverter 111 and PMOS transistors 113_1 and 113_3. The inverter 11 may inversely buffer the test period signal T_PD to generate an inverted test period signal T_PDB. The PMOS transistor 113_1 may be turned on to drive the pull-up source voltage VS_PU to the normal voltage V_NM when the test operation is not performed and the test period signal T_PD deactivated at a logic "low" level is received. The PMOS transistor 113_3 may be turned on to drive the pull-up source voltage VS_PU to the test voltage V_TM when the test period signal T_PD activated at a logic "high" level is received during the test period in which the test operation is performed. Each of the PMOS transistor 113_1 and the PMOS transistor 113_3 may operate as a driver device.

Figure 3:
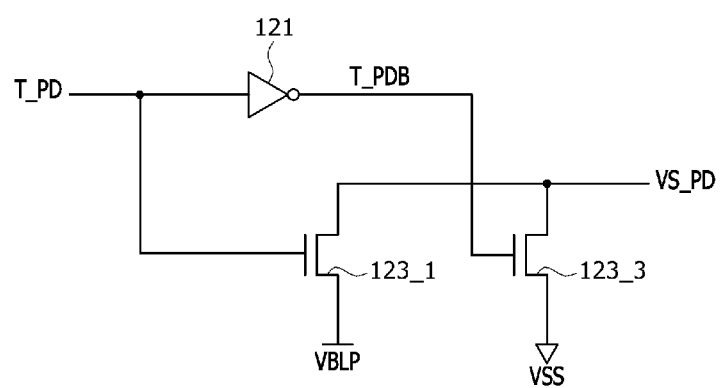
FIG. 3 is a circuit diagram illustrating a pull-down source voltage generation circuit according to an embodiment of the present disclosure.

FIG. 3 is a circuit diagram illustrating a pull-down source voltage generation circuit 15A according to an example of the pull-down source voltage generation circuit 1 in FIG. 1. As shown in FIG. 3, the pull-down source voltage generation circuit 15A may include an inverter 121 and NMOS transistors 123_1 and 123_3. The inverter 121 may inversely buffer the test period signal T_PD to generate an inverted test period signal T_PDB. The NMOS transistor 123_1 may be turned on to drive the pull-down source voltage VS_PD to the bit line pre-charge voltage VBLP during the test period when the test period signal T_PD activated at a logic "high level is received. The NMOS transistor 123_3 may be turned on to drive the pull-down source voltage VS_PD to the ground voltage VSS when the test operation is not performed and the test period signal T_PD deactivated at a logic "low" level is received. Each of the NMOS transistor 123_1 and the NMOS transistor 123_3 may operate as a driver device.

Figure 4:
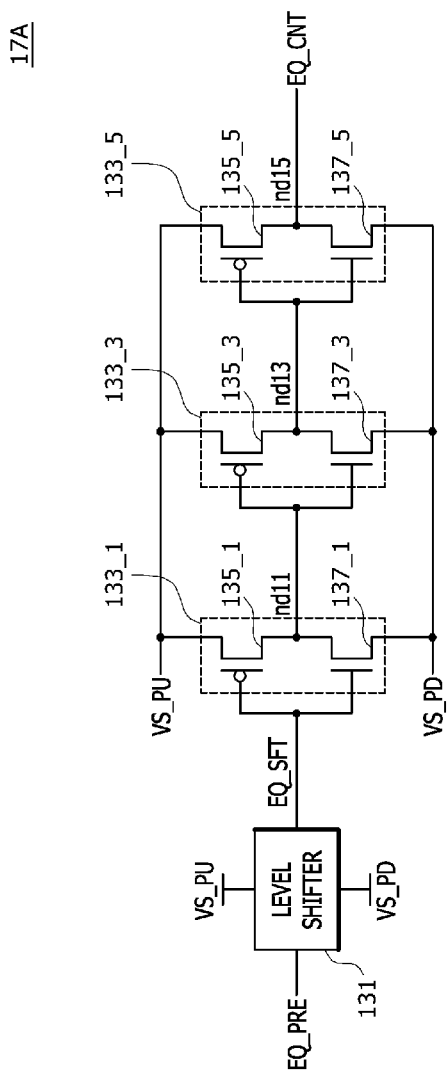
FIG. 4 is a circuit diagram illustrating an equalization control signal driver according to an embodiment of the present disclosure.

FIG. 4 is a circuit diagram illustrating an equalization control signal driver 17A according to an example of the equalization control signal driver 17 in FIG. 1. As shown in FIG. 4, the equalization control signal driver 17A may include a level shifter 131 and buffer circuits 133_1, 133_3, and 133_5. The level shifter 131 may receive the pre-equalization control signal EQ_PRE to generate a shifting equalization control signal EQ_SFT that swings between the pull-up source voltage VS_PU and the pull-down source voltage VS_PD. The buffer circuits 133_1, 133_3, and 133_5 may include PMOS transistors 135_1, 135_3, and 135_5 and NMOS transistors 137_1, 137_3, and 137_5, respectively. Each of the buffer circuits 133_1, 133_3, and 133_5 may receive the pull-up source voltage VS_PU and the pull-down source voltage VS_PD, and inversely buffer the shifting equalization control signal EQ_SFT to generate the equalization control signal EQ_CNT. Each of the buffer circuits 133_1, 133_3, and 133_5 may operate by receiving the pull-up source voltage VS_PU driven to the test voltage V_TM and the pull-down source voltage VS_PD driven to the bit line pre-charge voltage VBLP during the test period. During the test period, because the pull-down source voltage VS_PD is also set to the bit line pre-charge voltage VBLP boosted higher than the ground voltage VSS when the pull-up source voltage VS_PU is set to the test voltage V_TM boosted higher than the normal voltage V_NM, a gate-source voltage or a gate-drain voltage of each of the PMOS transistors 135_1, 135_3, 135_5 and the NMOS transistors 137_1, 137_3, and 137_5 included in the buffer circuits 133_1, 133_3, and 133_5, respectively may be maintained below a certain voltage level. Accordingly, reliability of each of the PMOS transistors 135_1, 135_3, and 135_5 and the NMOS transistors 137_1, 137_3, and 137_5 may be secured. The buffer circuits 133_1 and 133_3 may be located in driver regions (43_1 and 43_3 in FIG. 13) where sub word line drivers are disposed, and the buffer circuit 133_5 may be located in sub-hole regions (47_1 and 47_3 in FIG. 13) between a sense amplifier region (45 in FIG. 13) where sense amplifiers are disposed and the driver regions (43_1 and 43_3 in FIG. 13).

Figure 5:
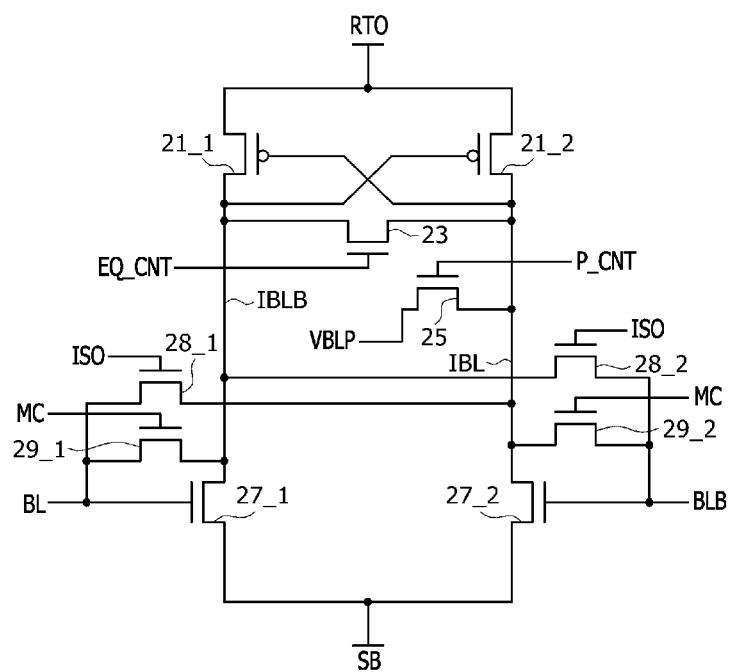
FIG. 5 is a circuit diagram illustrating a bit line sense amplifier according to an embodiment of the present disclosure.

FIG. 5 is a circuit diagram illustrating a bit line sense amplifier 19A according to an example of the bit line sense amplifier 19 in FIG. 1. As shown in FIG. 5, the bit line sense amplifier 19A may include PMOS transistors 21_1 and 21_2 and NMOS transistors 23, 25, 27_1, 27_2, 28_1, 28_2, 29_1, and 29_2. The PMOS transistors 21_1 and 21_2 may be turned on based on voltage levels of an internal bit line pair IBL and IBLB to drive the internal bit line pair IBL and IBLB, respectively to a sense amplifier drive voltage RTO. The NMOS transistor 23 may be turned on based on the equalization control signal EQ_CNT to set the voltage levels of the internal bit line pair IBL and IBLB to be the same. The NMOS transistor 25 may be turned on based on the pre-charge control signal P_CNT to drive the internal bit line IBL to the bit line pre-charge voltage VBLP. The NMOS transistors 27_1 and 27_2 may be turned on based on the voltage levels of a bit line pair BL and BLB to drive the internal bit line pair IBL and IBLB, respectively to a sense amplifier drive voltage SB. The NMOS transistors 28_1 and 28_2 may be turned off based on the isolation control signal ISO to isolate the bit line pair BL and BLB and the internal bit line pair IBL and IBLB from each other. The NMOS transistors 29_1 and 29_2 may be turned on based on the compensation control signal MC to connect the bit line BL and the internal inverted bit line IBLB to each other and connect the inverted bit line BLB and the internal bit line IBL to each other, thereby compensating the offsets of the PMOS transistors 21_1 and 21_2 and the NMOS transistors 27_1 and 27_2. The bit line sense amplifier 19A may perform the active operations in the active period including a compensation period, an equalization period, and a sensing period, based on the isolation control signal ISO, the compensation control signal MC, the pre-charge control signal P_CNT, the equalization control signal EQ_CNT, and the bit line pre-charge voltage VBLP. The bit line sense amplifier 19A may connect the bit line BL and the internal inverted bit line IBLB to each other and connect the inverted bit line BLB and the internal bit line IBL to each other to compensate the offsets of the PMOS transistors 21_1 and 21_2 and the NMOS transistors 27_1 and 27_2, according to the NMOS transistors 29_1 and 29_2 turned on during the compensation period in which the isolation control signal ISO is deactivated and the compensation control signal MC is activated. The bit line sense amplifier 19A may drive the voltage levels of the internal bit line pair IBL and IBLB to the bit line pre-charge voltage VBLP according to the NMOS transistors 23 and 25 turned on during the equalization period in which the pre-charge control signal P_CNT and the equalization control signal EQ_CNT are activated. The bit line sense amplifier 19A may sense the voltage levels of the bit line pair BL and BLB during the sensing period to drive the internal bit line pair IBL and IBLB. The bit line sense amplifier 19A may receive the compensation control signal MC, the pre-charge control signal P_CNT, and the equalization control signal EQ_CNT which are set to the test voltage V_TM boosted higher than the normal voltage V_NM during the test period to perform the test operation of checking the reliability of the NMOS transistors 23, 25, 29-1, and 29_2.

Figure 6:
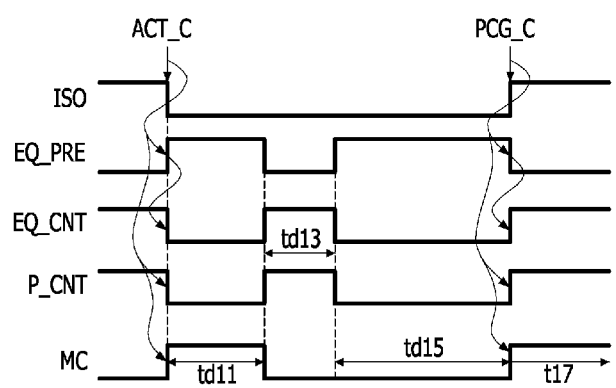
FIGS. 6 and 7 are timing diagrams illustrating operation control signals generated for an active operation and a test operation of a semiconductor device according to an embodiment of the present disclosure.
Figure 7:
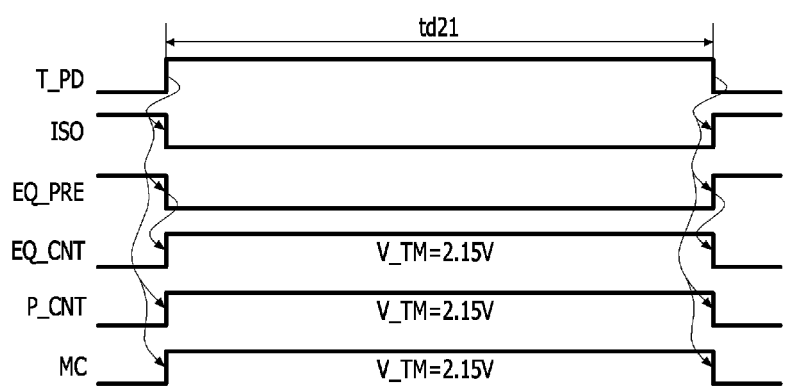

FIGS. 6 and 7 are timing diagrams illustrating the operation control signals generated for the active operation, the pre-charge operation, and the test operation in the semiconductor device 10 in FIG. 1.

As shown in FIG. 6, when the active command ACT_C for the active operation is generated, the active operation may be performed during the active period including a compensation period td11, an equalization period td13, and a sensing period td15, and when the pre-charge command PCG_C for the pre-charge operation is generated, the pre-charge operation may be performed during a pre-charge period td17. Because the isolation control signal ISO is deactivated and the compensation control signal MC is activated during the compensation period td11, the bit line BL and the internal inverted bit line IBLB may be connected to each other and the inverted bit line BLB and the internal bit line IBL may be connected to each other, and the offsets of the PMOS transistors 21_1 and 21_2 and the NMOS transistors 27_1 and 27_2 may be compensated. Because the pre-charge control signal P_CNT and the equalization control signal EQ_CNT are activated during the equalization period td13, the voltage levels of the internal bit line pairs IBL and IBLB may be driven to the bit line pre-charge voltage VBLP. During the sensing period td15, in a state in which the compensation control signal MC is deactivated, and the isolation control signal ISO, the equalization control signal EQ_CNT, and the pre-charge control signal P_CNT are all deactivated, the sensing operation may be performed in which the voltage levels of the bit line pairs BL and BLB are sensed and the internal bit line pairs IBL and IBLB are driven. During the pre-charge period td17, the isolation control signal ISO, the compensation control signal MC, the equalization control signal EQ_CNT, and the pre-charge control signal P_CNT may all be activated for the pre-charge operation.

As shown in FIG. 7, during the test period td21 for the test operation, the isolation control signal ISO is deactivated, and the compensation control signal MC, the equalization control signal EQ_CNT, and the pre-charge control signal P_CNT are set to the test voltage V_TM boosted higher than the normal voltage V_NM, so that the test operation to check the reliability of the NMOS transistors 23, 25, 29_1, and 29_2 may be performed.

FIGS. 8 to 11 are circuit diagrams illustrating a test operation of a semiconductor device according to an embodiment of the present disclosure. As an example, a test operation of the semiconductor device shown in FIG. 1 will be described using the circuit diagrams of FIGS. 2 to 5.

Figure 8:
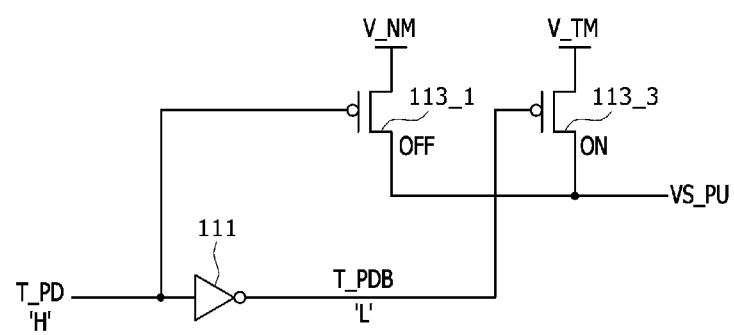
FIGS. 8 to 11 are circuit diagrams illustrating a test operation of a semiconductor device according to an embodiment of the present disclosure.

As shown in FIG. 8, during the test period in which the test operation is performed, because the inverted test period signal T_PDB is generated at a logic "low" level 'L' when the test period signal T_PD activated at a logic "high" level 'H' is received, the PMOS transistor 113_1 may be turned off and the PMOS transistor 113_3 may be turned on. Accordingly, the pull-up source voltage VS_PU may be driven to the test voltage V_TM boosted higher than the normal voltage V_NM.

Figure 9:
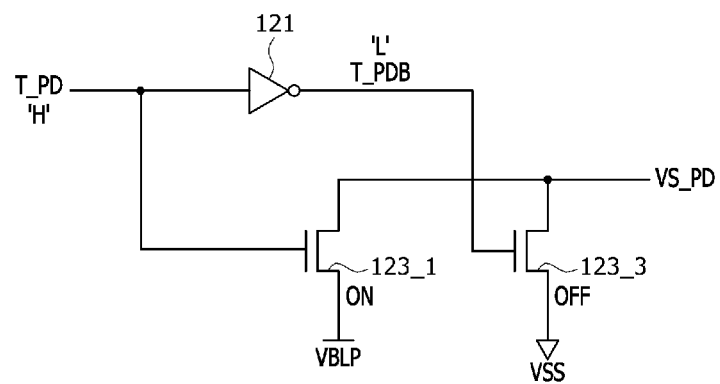

As shown in FIG. 9, during the test period in which the test operation is performed, because the inverted test period signal T_PDB is generated at a logic "low" level 'L' when the test period signal T_PD activated at a logic "high" level 'H' is received, the NMOS transistor 123_1 may be turned on and the NMOS transistor 123_3 may be turned off. Accordingly, the pull-down source voltage VS_PD may be driven to the bit line pre-charge voltage VBLP.

Figure 10:
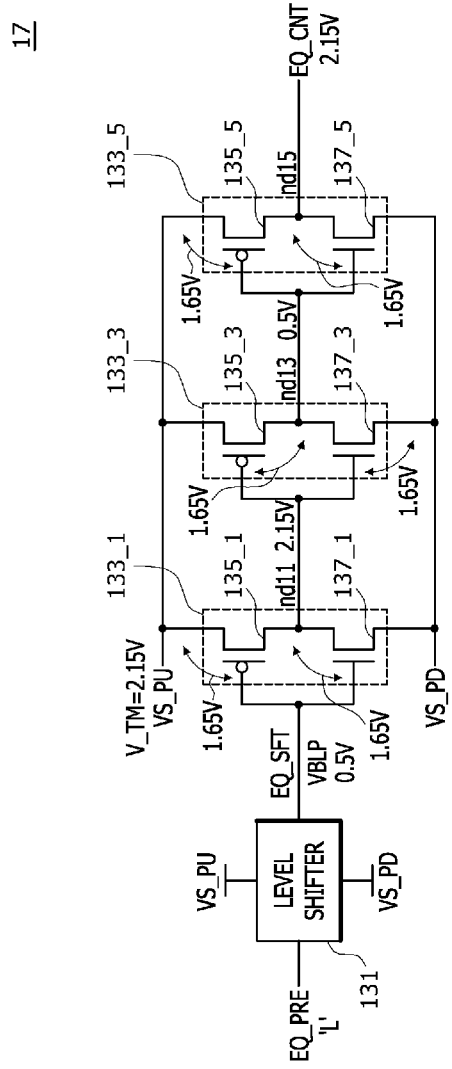

As shown in FIG. 10, during the test period in which the test operation is performed, because the pre-equalization control signal EQ_PRE is generated at a logic "low" level 'L', the shifting equalization control signal EQ_SFT output from the level shifter 131 may be set to '0.5 V', which is the bit line pre-charge voltage VBLP. The shifting equalization control signal EQ_SFT may be buffered through the buffer circuits 133_1, 133_3, and 133_5 and output as the equalization control signal EQ_CNT. Because each of the buffer circuits 133_1, 133_3, and 133_5 operate by receiving the pull-up source voltage VS_PU driven to the test voltage V_TM of '2.15 V' and the pull-down source voltage VS_PD driven to the bit line pre-charge voltage VBLP of '0.5 V' during the test period, the equalization control signal EQ_CNT may be set to '2.15 V'. During the test period, a gate-source voltage of the PMOS transistor 135_1 may be set to '1.65 V', a gate-drain voltage of the NMOS transistor 137_1 may be set to '1.65 V', a gate-drain voltage of the PMOS transistor 135_3 may be set to '1.65 V', a gate-source voltage of the NMOS transistor 137_3 may be set to '1.65 V', a gate-source voltage of the PMOS transistor 135_5 may be set to '1.65 V', and a gate-drain voltage of the NMOS transistor 135_1 may be set to '1.65 V'. That is, when the pull-up source voltage VS_PU that is driven to the test voltage V_TM of '2.15 V' is driven during the test period in which the test operation is performed, the pull-down source voltage VS_PD driven to the bit line pre-charge voltage VBLP boosted higher than the ground voltage VSS may be provided to the buffer circuits 133_1, 133_3, and 133_5. Accordingly, the reliability of the PMOS transistors 135_1, 135_3, and 135_5 and the NMOS transistors 137_1, 137_3, and 137_5 may be secured.

Figure 11:
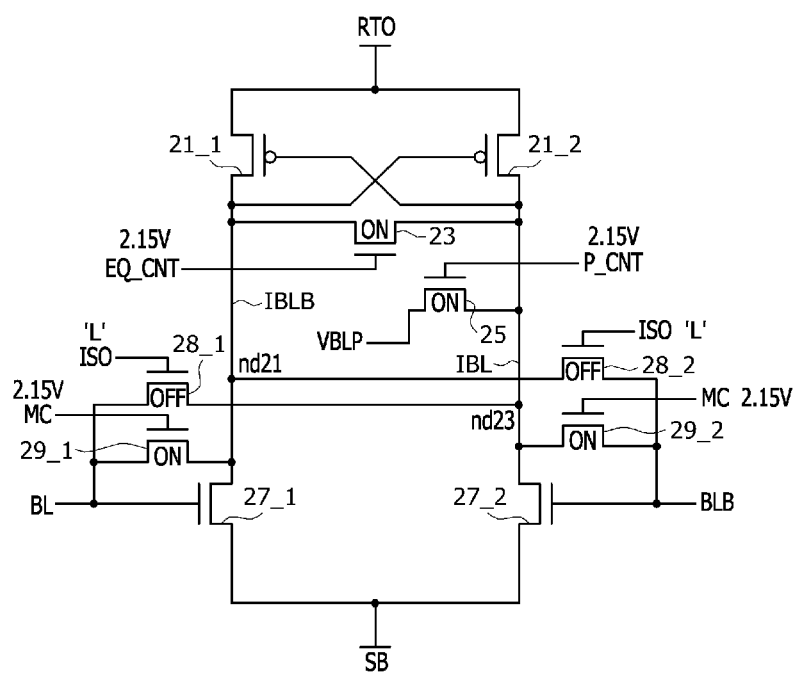

As shown in FIG. 11, during the test period in which the test operation is performed, in a state in which the isolation control signal ISO is deactivated at a logic "low" level 'L', the test operation may be performed to check the reliability of the NMOS transistors 23, 25, 29_1, and 29_2, which are turned on by application of the compensation control signal MC, the pre-charge control signal P_CNT, and the equalization control signal EQ_CNT set to the test voltage V_TM of '2.15 V'.

Figure 12:
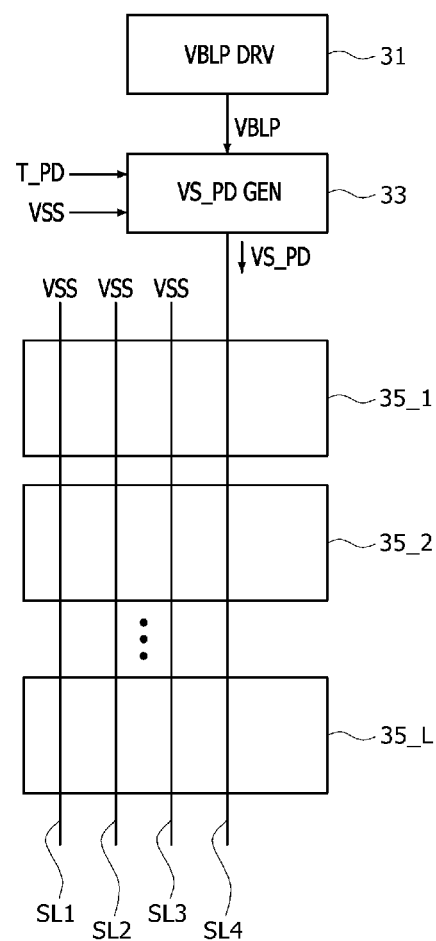
FIG. 12 is a block diagram illustrating a configuration of a semiconductor device according to another embodiment of the present disclosure.

FIG. 12 is a block diagram illustrating a configuration of a semiconductor device 3 according to another embodiment of the present disclosure. As shown in FIG. 12, the semiconductor device 3 may include a bit line pre-charge voltage driver (VBLP DRV) 31, a pull-down source voltage generation circuit (VS_PD GEN) 33, and first to Lth cell blocks 35_1, 35_2~35_L.

The bit line pre-charge voltage driver 31 may drive a bit line pre-charge voltage VBLP to have a predetermined voltage level. For example, when a normal voltage V_NM is set to 1.00 V, the bit line pre-charge voltage driver 31 may generate the bit line pre-charge voltage VBLP of 0.50 V, which is half the voltage level of the normal voltage V_NM. The pull-down source voltage generation circuit 33 may generate a pull-down source voltage VS_PD, based on a test period signal T_PD and the bit line pre-charge voltage VBLP. The pull-down source voltage generation circuit 33 may generate the pull-down source voltage VS_PD driven to a ground voltage VSS during a normal period, and may generate the pull-down source voltage VS_PD driven to the bit line pre-charge voltage VBLP during the test period in which the test operation is performed. Each of the first to Lth cell blocks 35_1, 35_2~35_L may be provided with the ground voltage VSS through signal lines SL1, SL2, and SL3, and may be provided with the pull-down source voltage VS_PD through a signal line SL4. Each of the first to Lth cell blocks 35_1, 35_2~35_L may include a plurality of MOS transistors (not shown), and reliability of the MOS transistors (not shown) may be secured during the test operation using the pull-down source voltage VS_PD.

Figure 13:
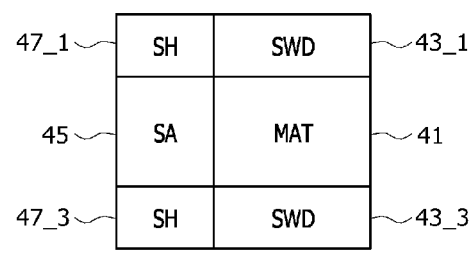
FIG. 13 is a block diagram illustrating an arrangement of inner regions included in a semiconductor device according to further another embodiment of the present disclosure.

FIG. 13 is a block diagram illustrating an arrangement of inner regions included in a semiconductor device 4 according to further another embodiment of the present disclosure. As shown in FIG. 13, the semiconductor device 4 may include a cell block region (MAT) 41 in which cell blocks are disposed, driver regions 43_1 and 43_3 in which sub-word line drivers SWD are disposed, a sense amplifier region 45 in which sense amplifiers SA are disposed, and sub-hole regions 47_1 and 47_3. The buffer circuits 133_1 and 133_3 included in the equalization control signal driver 17A shown in FIG. 4 may be located in the driver regions 43_1 and 43_3, and the buffer circuit 133_5 may be located in the sub-hole regions 47_1 and 47_3.

Figure 14:
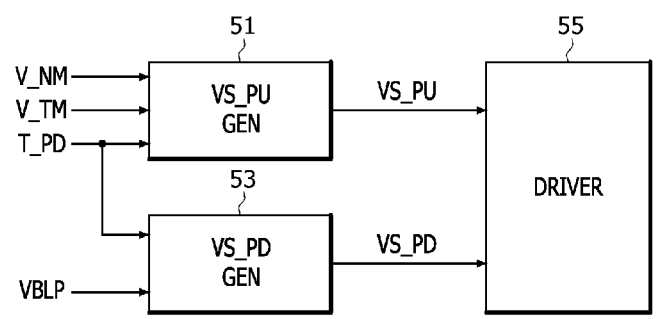
FIG. 14 is a block diagram illustrating a configuration of a semiconductor device according to further another embodiment of the present disclosure.

FIG. 14 is a block diagram illustrating a configuration of a semiconductor device 5 according to further another embodiment of the present disclosure. As shown in FIG. 14, the semiconductor device 5 may include a pull-up source voltage generation circuit (VS_PU GEN) 51, a pull-down source voltage generation circuit (VS_PD GEN) 53, and a driver 55.

The pull-up source voltage generation circuit 51 may generate a pull-up source voltage VS_PU driven to a normal voltage V_NM during a normal period, and may generate the pull-up source voltage VS_PU driven to a test voltage V_TM during a test period in which a test operation is performed. The pull-down source voltage generation circuit 53 may generate a pull-down source voltage VS_PD driven to a ground voltage VSS during the normal period, and may generate the pull-down source voltage VS_PD driven to a bit line pre-charge voltage VBLP during the test period in which the test operation is performed.

The driver 55 may include a plurality of MOS transistors (not shown) that receive the pull-up source voltage VS_PU and the pull-down source voltage VS_PD to drive various control signals (not shown) required for internal operations. The plurality of MOS transistors (not shown) may be supplied with the pull-down source voltage VS_PD set to the bit line pre-charge voltage VBLP boosted higher than the ground voltage VSS when the pull-up source voltage VS_PU set to the test voltage V_TM boosted higher than the normal voltage V_NM is supplied during the test period. Accordingly, a gate-source voltage or a gate-drain voltage of each of the plurality of MOS transistors (not shown) included in the driver 55 can be maintained below a certain voltage level, and reliability can be secured.

The semiconductor device 1 described above in FIG. 1, the semiconductor device 3 described above in FIG. 12, the semiconductor device 4 described above in FIG. 13, and the semiconductor device 5 described above in FIG. 14 may be applied to an electronic system including a memory system, a graphic system, a computing system, and a mobile system. For example, referring to FIG. 15, an electronic system 1000 according to an embodiment of the present disclosure may include a data storage unit 1001, a memory controller 1002, a buffer memory device 1003, and an input/output interface 1004.

The data storage unit 1001 may store data (not shown) applied from the memory controller 1002 according to a control signal from the memory controller 1002, may read out the stored data (not shown), to output the data to the memory controller 1002. Meanwhile, the data storage unit 1001 may include a non-volatile memory device capable of continuously storing data without loss even when power is cut off. The non-volatile memory device may be implemented as a flash memory (NOR flash memory, NAND flash memory) device, a phase change random access memory (PRAM) device, a resistive random access memory (RRAM) device, a spin transfer torque random access memory (STTRAM) device, or a magnetic random access memory (MRAM) device.

Figure 15:
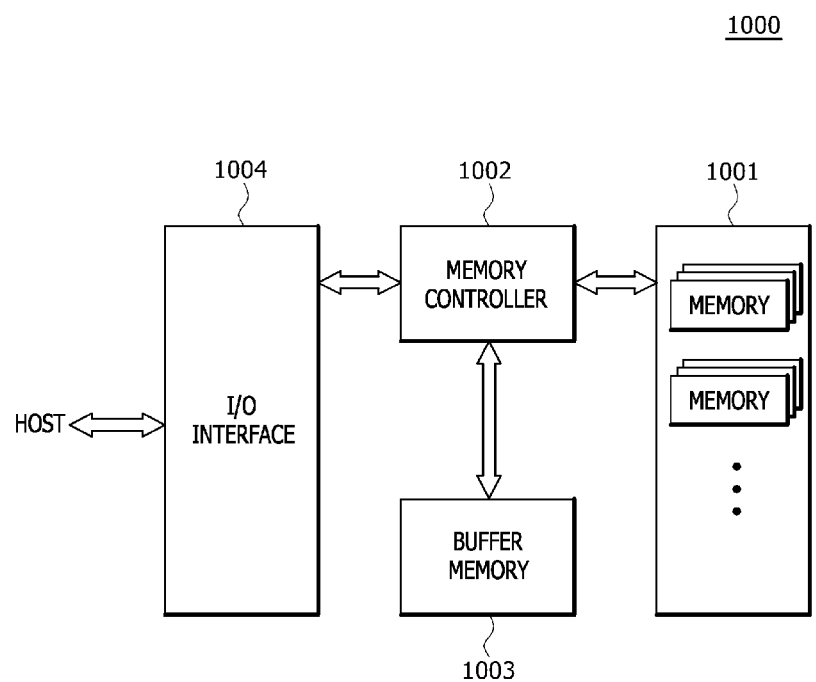
FIG. 15 is a block diagram illustrating a configuration of an electronic system according to an embodiment of the present disclosure.

The memory controller 1002 may decode a command applied from an external device (host device) through the input/output interface 1004, and may control data input/output for the data storage unit 1001 and the buffer memory device 1003 according to a decoding result. In FIG. 15, the memory controller 1002 is shown as one block, but a controller for controlling the data storage unit 1001 and a controller for controlling the buffer memory device 1003, which is a volatile memory device, may be configured independently.

The buffer memory device 1003 may temporarily store data to be processed by the memory controller 1002, that is, data (not shown) input and output to the data storage unit 1001. The buffer memory device 1003 may store data (not shown) applied from the memory controller 1002 according to a control signal. The buffer memory device 1003 may include the semiconductor device 1 described above with reference to FIG. 1, the semiconductor device 3 described above with reference to FIG. 12, the semiconductor device 4 described above with reference to FIG. 13, and the semiconductor device 5 described above with reference to FIG. 14. The buffer memory device 1003 may read out the stored data and output the data to the memory controller 1002. The buffer memory device 1003 may include volatile memory devices such as a dynamic random access memory (DRAM) device, a mobile DRAM device, and a static random access memory (SRAM) device.

The input/output interface 1004 may provide a physical connection between the memory controller 1002 and an external device (host) to allow the memory controller 1002 to receive a control signal for data input/output from the external device and to exchange data with the external device. The input/output interface 1004 may include one of a variety of interface protocols such as USB, MMC, PCI-E, SAS, SATA, PATA, SCSI, ESDI, IDE, and the like.

The electronic system 1000 may be used as an auxiliary storage device of a host device or an external storage device. The electronic system 1000 may include a solid state disk (SSD), a universal serial bus (USB) memory device, a secure digital (SD) card, a mini secure digital (mSD) card, a micro secure digital (micro SD) card, a secure digital high capacity (SDHC) card, a memory stick card, a smart media (SM) card, a multi-media card (MMC), an embedded multimedia card (eMMC), a compact flash (CF), and the like.

Figure 16:
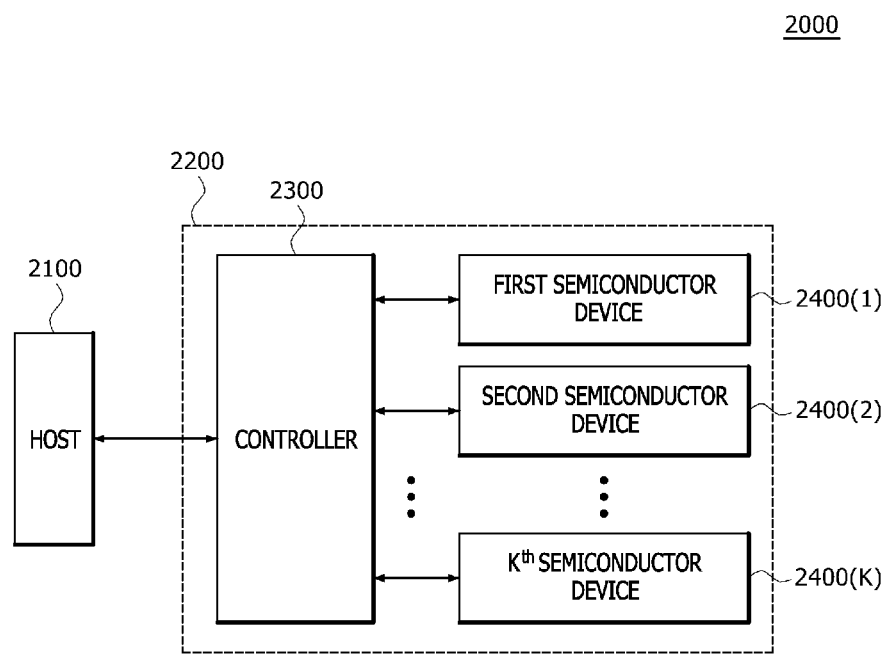
FIG. 16 is a block diagram illustrating a configuration of an electronic system according to another embodiment of the present disclosure.

FIG. 16 is a block diagram illustrating a configuration of an electronic system 2000 according to another embodiment of the present disclosure. As shown in FIG. 16, the electronic system 2000 may include a host 2100 and a semiconductor system 2200.

The host 2100 and the semiconductor system 2200 may transmit signals to each other using interface protocols. The interface protocols used between the host 2100 and the semiconductor system 2200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 2200 may include a controller 2300 and semiconductor devices 2400(1:K). The controller 2300 may apply a voltage code V_CD, a code input control signal CICNT, and a fuse selection address FS_ADD to each of the semiconductor devices 2400(1:K). Each of the semiconductor devices 2400(1:K) may receive the voltage code V_CD, the code input control signal CICNT, and the fuse selection address FS_ADD to adjust a voltage level of an internal voltage VINT.

Each of the semiconductor devices 2400(1:K) may include the semiconductor device 1 described above with reference to FIG. 1, the semiconductor device 3 described above with reference to FIG. 12, the semiconductor device 4 described above with reference to FIG. 13, and the semiconductor device 5 described above with reference to FIG. 14. Each of the semiconductor devices 2400(1:K) may be implemented with one of a dynamic random access memory (DRAM) device, a phase change random access memory (PRAM) device, a resistive random access memory (RRAM) device, a magnetic random access memory (MRAM) device, and ferroelectric random access memory (FRAM) device.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor device comprising:
    a pull-up source voltage generation circuit configured to drive a pull-up voltage to a normal voltage during a normal period, and to drive the pull-up source voltage to a test voltage during a test period;
    a pull-down source voltage generation circuit configured to drive a pull-down voltage to a ground voltage during the normal period, and to drive the pull-down source voltage to a bit line pre-charge voltage during the test period; and
    an equalization control signal driver configured to receive the pull-up source voltage and the pull-down source voltage to drive an equalization control signal for equalizing voltage levels of an internal bit line pair of a bit line sense amplifier.

2. The semiconductor device of claim 1, wherein the pull-up source voltage generation circuit is configured to:
    drive the pull-up source voltage to the normal voltage during the normal period in which normal operations including an active operation and a pre-charge operation are performed, and
    drive the pull-up source voltage to the test voltage during the test period in which a test operation of driving an operation control signal applied to the bit line sense amplifier to the test voltage is performed.

3. The semiconductor device of claim 1, wherein the pull-up source voltage generation circuit is configured to drive the pull-up source voltage to the test voltage boosted higher than the normal voltage during the test period.

4. The semiconductor device of claim 1, wherein the pull-up source voltage generation circuit includes:
    a first driver device configured to drive the pull-up source voltage to the normal voltage during the normal period, based on a test period signal activated during the test period; and
    a second driver device configured to drive the pull-up source voltage to the test voltage during the test period, based on the test period signal.

5. The semiconductor device of claim 1, wherein the pull-down source voltage generation circuit is configured to:
    drive the pull-down source voltage to the ground voltage during the normal period in which normal operations including an active operation and a pre-charge operation are performed, and
    drive the pull-down source voltage to the bit line pre-charge voltage during the test period in which a test operation of driving an operation control signal applied to the bit line sense amplifier to the test voltage is performed.

6. The semiconductor device of claim 1, wherein the pull-down source voltage generation circuit is configured to drive the pull-down source voltage to the bit line pre-charge voltage boosted higher than the ground voltage during the test period.

7. The semiconductor device of claim 1, wherein the pull-down source voltage generation circuit includes:
    a first driver device configured to drive the pull-down source voltage to the ground voltage during the normal period, based on a test period signal activated during the test period; and
    a second driver device configured to drive the pull-down source voltage to the bit line pre-charge voltage during the test period, based on the test period signal.

8. The semiconductor device of claim 1,
    wherein the equalization control signal driver includes at least one buffer circuit configured to operate by receiving the pull-up source voltage and the pull-down source voltage, and
    wherein the at least one buffer circuit drives the equalization control signal.

9. The semiconductor device of claim 1, wherein the equalization control signal driver includes:
    a level shifter configured to generate a shifting equalization control signal that swings between the pull-up source voltage and the pull-down source voltage, based on a pre-equalization control signal; and
    a buffer circuit configured to receive the pull-up source voltage and the pull-down source voltage to generate the equalization control signal by buffering the shifting equalization control signal.

10. The semiconductor device of claim 9, further comprising an operation control circuit configured to generate an isolation control signal, a compensation control signal, a pre-charge control signal, and the pre-equalization control signal based on a pre-charge command, an active command, and the test period signal.

11. The semiconductor device of claim 10, wherein the bit line sense amplifier is configured to receive the compensation control signal, the pre-charge control signal, and the pre-equalization control signal which are driven to the test voltage during the test period.

12. A semiconductor device comprising:
    a pull-up source voltage generation circuit configured to drive a pull-up voltage to a normal voltage during a normal period, and to drive the pull-up source voltage to a test voltage during a test period;
    a pull-down source voltage generation circuit configured to drive a pull-down voltage to a ground voltage during the normal period, and to drive the pull-down source voltage to a bit line pre-charge voltage during the test period; and
    a driver configured to receive the pull-up source voltage and the pull-down source voltage to drive a control signal.

* * * * *